May 12, 1970 ICHIRO MIWA ET AL 3,512,116

CIRCUIT MEMBER HAVING A CONNECTING ADAPTER AND A METHOD FOR CONNECTING SAID MEMBER

Filed Feb. 9, 1967 4 Sheets-Sheet 1

INVENTORS

ICHIRO MIWA
KEIKO KASAI
MAKOTO HOMMA

BY Paul M. Craig, Jr.

ATTORNEY

INVENTORS
ICHIRO MIWA
KEIKO KASAI
MAKOTO HOMMA

BY Paul M. Craig, Jr.
ATTORNEY

INVENTORS
ICHIRO MIWA
KEIKO KASAI
MAKOTO HOMMA

BY Paul M. Craig, Jr.
ATTORNEY

INVENTORS
ICHIRO MIWA
KEIKO KASAI
MAKOTO HOMMA

BY Paul M. Craig, Jr.

ATTORNEY

United States Patent Office 3,512,116

Patented May 12, 1970

3,512,116

CIRCUIT MEMBER HAVING A CONNECTING ADAPTER AND A METHOD FOR CONNECTING SAID MEMBER

Ichiro Miwa, Kodaira-shi, Keiko Kasai, Kofu-shi, and Makoto Homma, Chiba-shi, Japan, assignors to Hitachi, Ltd., Tokyo, Japan, a corporation of Japan Filed Feb. 9, 1967, Ser. No. 615,002

Claims priority, application Japan, Feb. 16, 1966, 41/8,858, 41/8,859

Int. Cl. H01r *11/30, 13/36*

U.S. Cl. 339—12 13 Claims

ABSTRACT OF THE DISCLOSURE

In connecting a circuit member such as an integrated semiconductor circuit having a number of lead wires onto a female member such as a socket which is secured to a printed substrate, the procedure of inserting the lead wires in said female member is efficiently facilitated by the provision of a connecting adapter having a number of through holes corresponding in number to the lead wires, the latter being inserted through said holes, and by effecting the connection by adjusting the positions of the respective edges of the lead wires so as to be in register with the receiving holes of the female member while sliding either said adapter or the lead wires relative to each other.

Figure 1A:
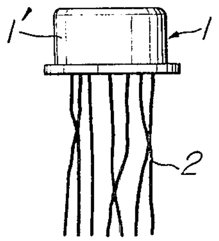

The present invention relates to a circuit member having a connecting adapter and to a method for connecting such member, and particularly to a method for connecting, onto a female member such as a socket, printed substrate or a jig, the lead wires which stem from the body of a circuit member. In general, known circuit members which are commercially used include unit circuit members such as transistors, diodes, resistors, capacitors and coils, and various composite circuit members such as integrated circuit member, hybrid circuit members, and high density assembled circuit members which are represented by micro modules formed either by hydridizing a plurality of unit circuit members or integrating them.

Of late, the tendency of producing these circuit members in a more compact size has been on the increase. As a natural result, the lead wires stemming from the circuit members tend to have reduced diameters and to become feebler. While this tendenecy is advantageous on one hand in that the processing of the lead wires in the operation of incorporating the circuit members into apparatuses is facilitated and also that the mechanical stresses applied to the bodies of the circuit members are minimized, it has shortcomings which overshadow the aforesaid advantages in that the lead wires become easily bent during the manufacture of circuit members, causing great inconveniences in the connection of the lead wires onto the sockets which is necessary for conducting various measurements and also in connecting the lead wires to printed substrates during the operation of mounting the circuit members to apparatuses. Thus, not only the manufacture of the circuit members of this type is hampered, but also is affected the testing and measurements as well as the automatization and efficiency of their connection onto printed substrates or the like.

In the manufacture of circuit members of said type, there frequently arises the necessity for connecting the lead wires stemming from the bodies of the circuit members to jigs. Even with completed circuit members, there are frequently carried out attachment and detachment of lead wires to and from the sockets to undergo testing or determination of various characteristics of the circuit members or to perform subsequent confirmative tests.

Furthermore, in an operation of incorporating circuit members into an apparatus, there arises the necessity for connecting the lead wires to the female member during the process of attaching the circuit member to a socket or a printed substrate. Lead wires having a reduced diameter would hamper the automatization and the efficiency of such operations.

In a device wherein the number of the lead wires is relatively limited to the order of from one to three, the connection of the lead wires and particularly the adjustment of their positions onto the female member, even though the lead wires are of a very small diameter and are made of a soft material, are carried out without any substantial difficulty. However, in a device wherein the component members are of complicated structures or in a device wherein a number of circuit members are formed into an integral unit as has been previously discussed, such a device contains, as a matter of fact, an increased number of lead wires, and this results in a great difficulty in effecting the connection of the lead wires to the female member, particularly in the positioning of the lead wires onto the female member. In view of the fact that this connecting operation has to be conducted repeatedly in succession onto jigs, sockets and printed substrates as has been stated in a number of manufacturing processes including the circuit member manufacturing process, the examination and determination process, and the process of applying the circuit members onto the circuitry apparatuses, there is resulted eventually a considerable amount of losses as viewed from the economical aspect.

It is a primary object of the present invention to provide a means to facilitate the connection of a circuit member having a number of lead wires onto a female member.

Another object of the present invention is to provide a means to facilitate the adjustment of the position of a circuit member having a number of lead wires onto a female member.

Still another object of the present invention is to provide a means to facilitate the connection of a circuit member onto a socket secured to a substrate.

The present invention has been worked out to attain these objects. The purport of the present invention, therefore, lies in the provision of a circuit member having a connecting adapter and also to provide a method for connecting such circuit member, this invention being characterized in that said circuit member has its body from which stem lead wires which are slidably inserted into the holes provided in said adapter and also in the provision of the method for connecting the circuit member, which comprises the steps of adjusting the lead-wire-inserting holes of the adapter so as to be in register with the holes of a female member, and sliding the lead wires inserted through said holes of the adapter therethrough, whereby the lead wires are connected onto the lead-wire-connection site in said female member.

The foregoing objects, features and advantages of the present invention will become apparent by reading the following more particular description of the embodiments of the invention, when taken in conjunction with the accompanying drawings.

Figure 2A:
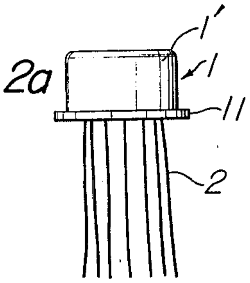
Figure 3A:
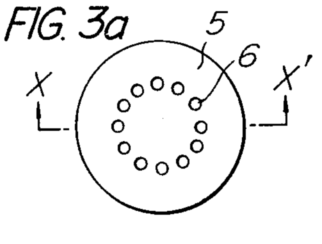
Figure 2B:
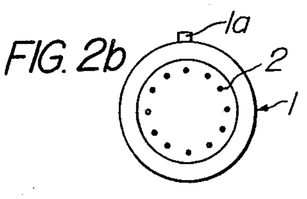
Figure 3B:
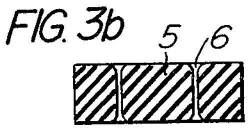
Figure 4:
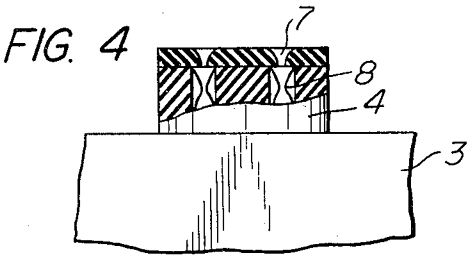
Figure 6A:
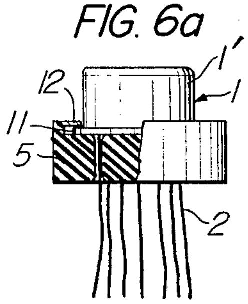
Figure 6B:
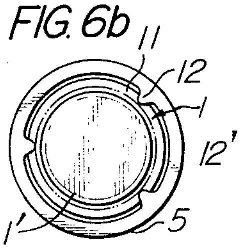
Figure 7A:
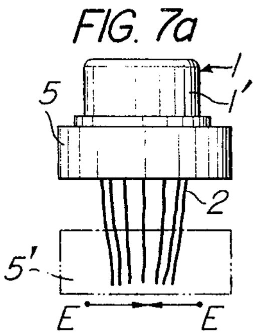
Figure 7B:
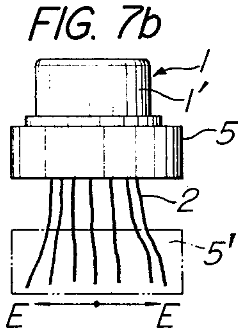
Figure 10A:
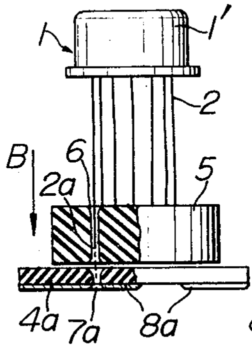
Figure 10B:
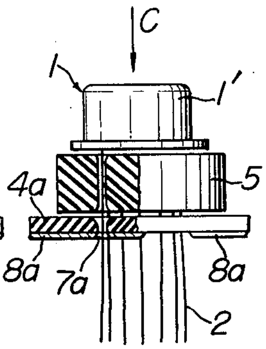
Figure 10C:
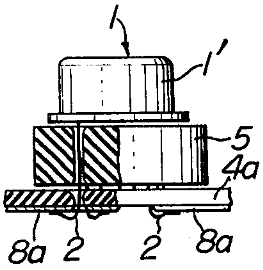
Figure 11:
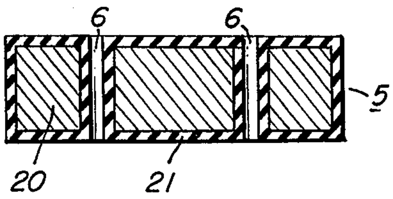

FIG. 1*a* through FIG. 1*e* are representations of the conventional method for connecting a circuit member to a socket;

FIG. 2*a* and FIG. 2*b* are a side elevational view and a bottom view, respectively, of a circuit member having a number of lead wires and being used in the connecting method of the present invention;

FIG. 3*a* is a top view of the adapter used in the connecting method of the present invention;

FIG. 3*b* is a longitudinal cross sectional view taken along the line *x–x'* of FIG. 3*a*;

FIG. 4 is a side elevational view, partly in section, of a female member used in the connecting method of the present invention;

FIG. 5*a* through FIG. 5*e* are representations showing an embodiment of the present invention;

FIG. 6*a* and FIG. 6*b* are representations showing another embodiment of the present invention, wherein FIG. 6*a* is a side elevational view, partly in section, while FIG. 6*b* is a top view thereof;

FIG. 7*a* and FIG. 7*b* are representations showing other variations of another embodiment of the present invention;

FIG. 8*a* through FIG. 8*d* are representations showing variations of another embodiment, respectively, of the adapter of the present invention;

FIG. 9*a* through FIG. 9*e* are representations showing variations of another embodiment of the present invention;

FIG. 10*a* through FIG. 10*c* are representations showing a further embodiment of the present invention; and FIG. 11 is a sectional view showing a further embodiment of the present invention.

In the drawings, like parts are indicated by like reference numerals.

In FIG. 1*a* through FIG. 1*e*, description will be made on the conventional method for connecting a circuit member having a number of lead wires onto a female member.

Figure 1B:
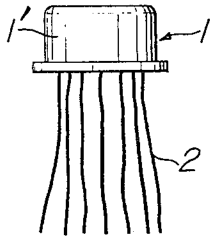
Figure 1C:
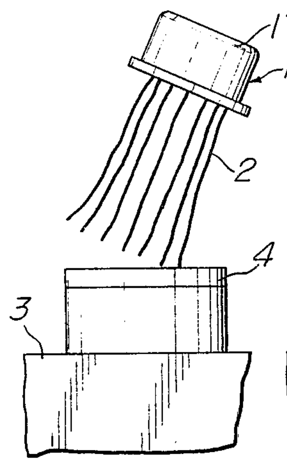
Figure 1D:
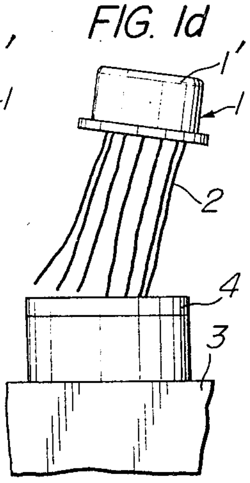
Figure 1E:
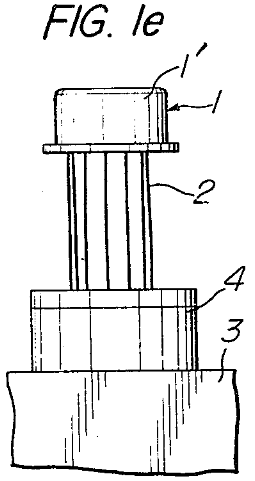

As has been stated previously, the numerous lead wires generally indicated by reference numeral 2 and stemming outwardly from the body 1′ of a circuit member 1 are quite small in diameter and are made of a relatively soft material. Therefore, they are in most cases are often bent or crossed each other as shown in FIG. 1*a*. It is, therefore, necessary to adjust the lead wires so as to assume their proper shape as shown in FIG. 1*b*. In this adjusting operation, it is desirous that the lead wires 2 be arranged so as to slightly diverge outwardly relative to the center of the body 1′ of the circuit member as shown in FIG. 1*b*. Thereafter, the lead wires are inserted in a socket 4 which is secured to a measurement apparatus 3 as shown in FIG. 1*c*. In this operation, the circuit member 1 is first tilted somewhat so that the first lead wire 2 which serves as the reference lead wire is inserted shallowly in a corresponding hole of the socket 4, and subsequently the adjacent lead wires are inserted in succession in their mating holes of the socket while their shapes are being corrected. The connection is completed when all of the lead wires have been inserted in the holes as shown in FIG. 1*e*.

When the connection is conducted according to such conventional method, there are encountered the following inconveniences. Firstly, the fact that the socket 4 is fixed to the measurement apparatus 3 requires, in the insertion of the lead wires 2 one by one into the holes of the socket 4, that the adjustment of their positions is effected either by adjusting the position of the body 1′ of the circuit member or by adjusting the positions of the respective lead wires 2 themselves. Besides, this troublesome connecting operation has to be repeated in various processes and this renders the entire operation quite inefficient. Secondly, such adjustment will provide mechanical vibrations and shocks to the contacts located in the holes of the socket 4, resulting in a markedly reduced life of the socket and in a cause for the occurrence of mal-contacts. Thirdly, an increase in the number of inserting processes will result in an increased occurrence of bending of the lead wires, causing the possibility that the lead wires are broken at particularly the site where they stem from the body 1′ of the circuit member.

Next, some of the embodiments will be described in detail by referring to the drawings. Description will first be made of the circuit member, the adapter and the female member all of which are used in the present invention.

FIG. 2*a* and FIG. 2*b* illustrate a circuit member which is used in the present invention. FIG. 2*a* is a side elevational view showing the circuit member 1, while FIG. 2*b* is a bottom view of said circuit member 1. In these drawings, reference numeral 1′ represents the body of the circuit member, and numeral 2 represents the lead wires in general which stem from the body 1′ of the circuit member. The lead wires 2 are mechanically fixed to said body 1′ of the circuit member and the lead wires 2 are disposed in a predetermined pattern of arrangement. Said circuit member 1 may be a finished article having an electric characteristic required as a circuit member, or an unfinished or semicomplete article prior to being imparted an electric characteristic. Also, the body 1′ of the aforesaid circuit member in general is formed with a stem which consists of insulating materials or metal materials. In some instances, it may be formed with a resin mould.

FIG. 3*a* is a top view of the adapter 5 which is used in the present invention. FIG. 3*b* is a longitudinal cross sectional view of the same taken along the line X–X′ in FIG. 3*a*. In these drawings, reference numeral 6 represents a through-hole in which is inserted a lead wire 2. Said hole is provided with a diameter which is slightly greater than that of the lead wire 2 so as to permit said lead wire 2 to slide therethrough.

FIG. 4 is a longitudinal cross sectional view of a female member which is used in the present invention. For example, reference numeral 3 represents the body of the measurement apparatus, and numeral 4 represents a socket serving as the female member. Numeral 7 represents an introducing hole for receiving the lead wire of the socket. The introducing holes which are generally indicated by numeral 7 are disposed so as to correspond, in the pattern of arrangement, to the through-holes 6 of the aforesaid adapter 5. It should be understood by those skilled in the art that said hole 7 for introducing a lead wire may be formed integrally with the lead-wire connecting portion 8 of the socket 4.

Description will next be directed to the method for connecting the circuit member of the present invention.

Figure 5A:
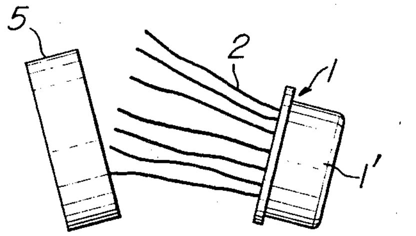
Figure 5B:
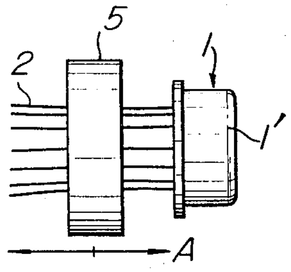

FIG. 5*a* through FIG. 5*e* are representations illustrating the method for connecting said circuit member 1 onto a socket 4. FIG. 5*a* shows the manner in which the lead wires 2 stemming from the body 1′ of the circuit member are introduced into the holes 6 formed through the adapter 5. FIG. 5*b* shows the lead wires 2 which have been slidably introduced through the holes of the adapter 5 as indicated by the arrow A. The manner in which the lead wires 2 are inserted through the holes 6 of the adapter 5 has some resemblance to the conventional manner in which the lead wires 2 are connected onto a socket 4. There is, however, a marked difference between these two manners in that, according to the present invention, the insertion of the lead wires 2 through the holes 6 of the adapter 5 is not effected with the adapter 5 being secured to the body of the measurement apparatus as is encountered in effecting the connection to a socket 4 in the manner of the prior art, but is effected by the operation of both the adapter 5 and the circuit member 1 relative to each other. As a result, the connecting operation can be effected with a great detal of efficiency and swoothness as compared with the operation effected according to the conventional manner.

Figure 5C:
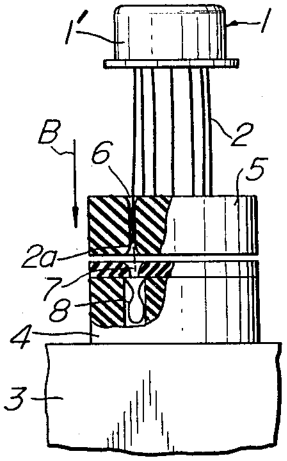
Figure 5D:
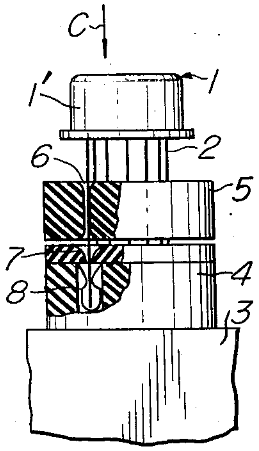
Figure 5E:
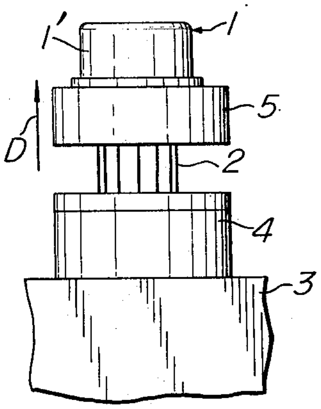

FIG. 5*c* shows the state of the lead wires 2 relative to the adapter 5 in which the positional relationship between the respective lead wires 2 is adjusted by sliding the adapter 5 as far as the lowermost ends (including the lowermost faces and the adjacent portions indicated by reference numeral 2*a*) of the lead wires 2 as indicated by the arrow B, so that the lead wires 2 assume the predetermined positional relationship which is defined by the intervals between the holes 6 of the adapter 5 and also shows the state in which the holes 6 of the adapter 5 are placed in register with the lead-wire introducing holes 7 of the socket 4. FIG. 5*d* illustrates the state in which the circuit member 1 is pressed with a force in the direction indicated by the arrow C so that the lead wires 2 are brought into contact with the contacts 8 of the socket 4. In this state, some of the characteristics of the circuit member 1 can be measured. FIG. 5e illustrates the process for detaching the circuit member 1 off the socket after the aforesaid measurement of the circuit member has been completed. More specifically, by up-lifting the adapter 5 in the direction indicated by the arrow D, the circuit member 1 in its state of having the adapter 5 attached thereto can be withdrawn from the socket. This state of the circuit member relative to the adapter is quite useful in performing the connection of the circuit member further to other sockets to measure various other characteristics of the circuit member. In such instances, one can quite easily accomplish the purpose of effecting various measurements by merely repeating the aforesaid operation which has been described in connection with FIG. 5c through FIG. 5e. It is to be noted that this adapter 5 is used in a process of incorporating the circuit member in an apparatus. The adapter itself may also be eventually incorporated or left in the completed apparatus. While various kinds of materials may be used to manufacture the adapter 5, it is necessary that the material be an insulator in case the circuit member is subjected to an electrical treatment such as the measurement of the electrical characteristis thereof while the adapter remains attahed to the circuit member. For the purpose of avoiding the occurrence of a damage on the lead wires, socket or the like during the connecting operation, it is advantageous to use an adapter made of a relatively soft material or a porous material. In case it is intended to incorporate the adapter in a circuit apparatus, it is advantageous to use an adapter which is made of a material having good thermal conductivity such as Beryllia ceramic. Furthermore, when it is intended to incorporate the adapter directly in a circuit apparatus, it is desirous that the arrangement of the holes formed in the adapter 5 be in agreement with the pattern of arrangement of the lead wires at the sites the latter stem from the body 1' of said circuit member. However, in case said circuit member is too small in size to place the female member 4 in register with the distributed lead wires (meaning the placement of holes of the female member so as to correspond to the intervals between the lead wires) at the sites on the body of the circuit member where the lead wires stem therefrom, and in case, accordingly, there is a necessity for increasing the distance between the respective lead wires, it is desirous that the disposition of the holes (meaning the intervals between the holes) of the adapter 5 be made so as to have an increased distance between the respective holes in conformity with the increased distance between the lead wires of the female member. In such instance, it is further desirous to arrange the holes of the adapter in such manner that at the upper face of the adapter the holes are disposed so as to agree with the arrangement pattern of the lead wires viewed at the sites where they stem from the body of the circuit member, and that at the bottom face of the adapter, the holes are disposed so as to be in agreement with the holes of the female member.

According to the aforesaid method of the present invention, the intervals between the respective lead wires are adjusted by the use of the adapter before the lead wires are applied to the female member such as a socket, and therefore, the application of an unnecessary force to the female member such as a socket and to the lead wires is eliminated, resulting in that the breakage of the lead wires due to such causes can be avoided and that the life of the female member can be prolonged and also that mal-contact, breakage of the female member, or like hazards are prevented. Furthermore, as has been made clear from the foregoing statement, the connection between the adapter and the lead wires, and the connection between the lead wires and the female member can both be effected with a marked efficiency as compared with the method of the prior art, and also these two types of connection can be effected separately, which provides a further remarkable efficiency for the operation. Besides, one application of the adapter to a circuit member makes it possible for the operator to perform repetitive attachment and detachment of the lead wires to a number of female members one after another with the assistance of said adapter. As such, a further marked effect of the present invention can be obtained by applying this adapter to operations where there is a need for carrying out the attachment and detachment of lead wires successively to many female members in a number of different processes including, for example, circuit member manufacturing process (such as automatically controlled assembling process, intermediary inspection process and lead wire stretching and adjustment process), examination and measurement process, packing process and the process of incorporating circuit members into circuit apparatuses.

The present invention has been described in detail in connection with some of the embodiments. Further detailed descriptions will be made next on some of the improved embodiments which are useful in putting the present invention into practice.

EXAMPLE 1

In the present invention, it is desirable that the adapter 5 remains attached to the lead wires without casually slipping off the latter excepting the case where the lead wires 2 are connected onto the female member 4. Therefore, the instant example discloses several methods for preventing such casual detachment of the adapter 5 off the lead wires 2.

One such method has been worked out by utilizing the fact that either at least one or both of the body 1' of the circuit member and the lead wires are made of a magnetic material in many of the circuit members. This first method is characterized in that a magnet is used as the material of the adapter 5. A magnet which is useful for this purpose includes a sintered magnetic oxide which is known as felite, a compound of a magnetic metal or a powdered oxide and rubber which is known as the rubber magnet 20, and a magnet coated with an insulator 21, as shown in FIG. 11. The use of such magnet provides a number of advantages that not only the casual detachment of the adapter 5 off the lead wires 2 is prevented, but also the slidability between the lead wires 2 and the adapter 5 can be appropriately controlled.

Another method has been worked out by utilizing the fact that the body 1' of a circuit member 1 in general is provided with a shouldered portion 11 having an uneven surface portion as shown in FIG. 2a. Casual detachment of the adapter 5 off the lead wires 2 is prevented by forming the adapter 5 so as to be provided with lugs 12 as would fit in the shouldered portions 11 and by inserting the shouldered portions 11 formed on the body 1' of the circuit member, interiorly of the lugs 12 of the circuit member as shown in FIG. 6a which represents a side elevational view with part in section and in FIG. 6b which represents the top view thereof, and also by forming said lug portions 12 with a resilient material.

A further method has been worked out by utilizing the fact that the lead wires are relatively soft and small in diameter. In this example, the lead wires are held in the shape of being bent either inwardly as is shown in FIG. 7a or outwardly as is shown in FIG. 7b. It is important to note that in relying on such method, it is mandatory that the lead wires be bent to such an extent as would not hamper the sliding movement between the lead wires 2 and the adapter 5. This arrangement results in that the relative sliding movement can be appropriately controlled. Therefore, when the adapter 5 is slided as far as the lowermost portion of the lead wires as indicated by the dash line 5' in these drawings, a force indicated by the arrow E is applied to the adapter 5 by the lead wires, with the result that there is no fear for a casual detachment of the adapter to occur even in such state.

EXAMPLE 2

Figure 8A:
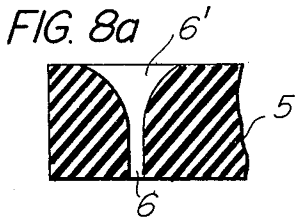

This example relates to an improvement of the method for inserting the lead wires 2 in the holes of the adapter 5. FIG. 8*a* through FIG. 8*d* show some of the instances. FIG. 8*a* shows the cross sectional view of an adapter, wherein a tapered guide 6' is formed in the upper portion of the hole 6 of the adapter 5. The insertion of the lead wires through the holes of the adapter is more easily effected by the use of the adapter 5 of this type.

As has been stated above, it is desirous in some occasions to prepare an adapter having different arrangement of hole disposition between the top face and the bottom face of the adapter. In such an instance, by providing the holes located on the top face of the adapter with a larger diameter, they can be utilized as the tapered guides 6'' in FIG. 8*b*.

Figure 8B:
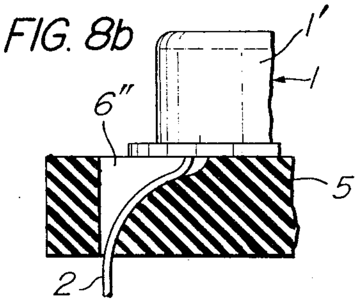

As illustrated in FIG. 8*b*, the intervals between the lead wires 2 of the circuit member 1 are enlarged by this type adapter 5 having holes with the tapered guides 6''.

Figure 8C:
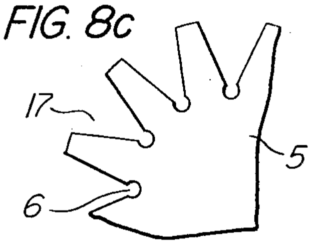

FIG. 8*c* illustrates a top view of an example of adapter having the structure that tapered channels 17 reaching the holes 6 are formed on the side face of the adapter 5 so that the lead wires 2 are inserted in the holes 6 from the lateral side of the adapter 5. In this instance, it is necessary that the adapter 5 be made of a soft, resilient material.

Figure 8D:
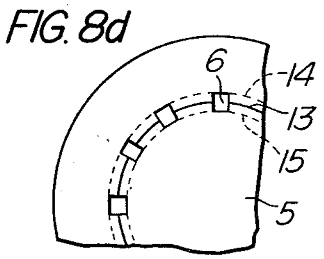

FIG. 8*d* shows a top view of an example of adapter wherein the latter is of the structure that it is divided into two sections. Specifically, the central section which is surrounded by lead wires and the outer peripheral section are separated at either the solid line 13 or at the dash lines 14 and 15 to form the inner section and the outer section, respectively. The lead wires are applied to the adapter 5 separately first to the inner section and then to the outer section to eventually produce a structure that the lead wires are inserted through the holes 6 which are formed by the aforesaid inner and outer sections.

EXAMPLE 3

Figure 9A:
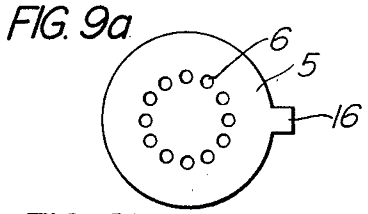
Figure 9B:
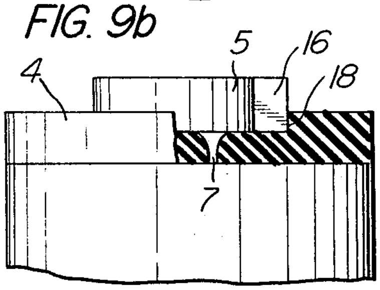
Figure 9C:
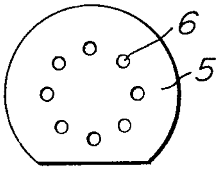
Figure 9D:
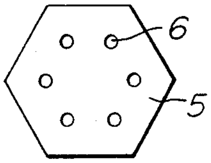
Figure 9E:
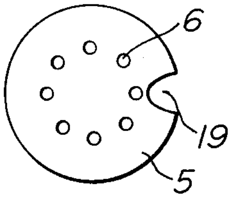

In the present invention, it is important to place the lead-wire inserting hole 6 of the adapter 5 so as to face and to be in agreement with the lead-wire introducing hole 7 of the female member such as a socket 4 shown in FIG. 4. This example provides an effective means for bringing the holes 6 and 7 in register therebetween. In this example, the plane configuration of the adapter is formed so as to have at least a non-circular shape such as a polygonal shape as shown in FIG. 9*c* and FIG. 9*d* or a shape having a projection 16 as shown in FIG. 9*a* or a recess 19 as shown in FIG. 9*e*. When the adapter such as illustrated in FIG. 9*a* is used the female member is provided with a formation of an adapter-holding portion such as the uneven portion 18 to define the position and the direction of the adapter when mounted on the female member as shown in FIG. 9*b*. By so arranging, the connection of the lead wires to the female member as is shown in FIG. 5*c* can be effected with an increased reliability and efficiency.

EXAMPLE 4

In the present invention, circuit members having a number of lead wires are most often used. Such plurality of lead wires require to be connected to a female member which has been prepared so as to correspond in the pattern of arrangement to the lead wires. For this reason, the body of the circuit member and the female member are provided with marks at particular sites of both members. Such mark is represented by, for example, a protrusion which is shown by 1*a* in FIG 2*b*. Other indications include the provision of a particular interval between certain lead wires so as to be distinguished from the other intervals as is seen in miniature vacuum tubes or the like. Various other means can be considered to attain this end. In case, however, the circuit member has a substantially many and long lead wires, and in case the lead wires are easily bent, it is difficult to bring the mark of the body of the circuit member so as to agree with the mark of the female member. According to the present example, such adjustment of the positions of the marks can be effected efficiently. Specifically, a mark is provided on the adapter. An effective mark is produced by utilizing a protrusion 16 as is shown in FIG. 9*a*. A mark may be provided in various other fashions. Since the adapter is located near the female member or is positioned so as to be in contact with the latter when it is intended to connect the lead wires to the female member as is clear from the foregoing statement, the employment of an adapter having the aforesaid mark insures that the adjustment of the marks can be quite efficiently effected with reliability by merely bringing the mark of the adapter so as to be in agreement with the mark of the female member.

EXAMPLE 5

The present invention has been described as a circuit member having an adapter and also as to how they are connected to a female member.

Now, description will be directed, in connection with FIG. 10*a* through FIG. 10*c*, to an example where the adapter is utilized as a spacer between the circuit member and the female member, by fixing the circuit member after it has been connected to the female member with the adapter being left therebetween.

FIG. 10*a* through FIG. 10*c* are side elevational views, partly in section, showing the procedure for attaching said circuit member onto a printed substrate.

In the drawings, reference numeral 4*a* represents a printed substrate which serves as the female member; numeral 7*a* represents the holes formed in said substrate for inserting the lead wires therethrough; and numeral 8*a* represents a printed conductive metal layer provided on the rear side of the printed substrate 4*a*.

Said procedure is completed by the following steps: first sliding, as shown by the arrow B, the adapter 5 with inserted lead wires 2 stemming from the body 1' of the circuit member to the vicinity of the lower portion indicated by 2*a* of the lead wires 2; thereafter adjusting the adapter 5 and the pirnted substrate 4*a* relative to each other so that the holes on the lower face of the adapter 5 are brought in register with the holes 7*a* of the printed substrate 4*a*, said holes 7*a* being provided there for receiving the lead wires; then, as is shown in FIG. 10*b*, applying a pressure, in the direction indicated by the arrow C, to the body 1' of the circuit member 1 to slide the lead wires 2 through the holes 6 of the adapter 5 and also to pass the lead wires 2 through the holes 7*a* formed through the printed substrate; then cutting off, in this state, the unnecessary excess portions of the lead wires 2 extending beyond the holes 7*a*; and thereafter connecting the free end portions of the lead wires 2, by a known technique such, for example, as soldering, onto a conductive layer 8*a* provided on the rear face of the printed substrate 4*a*, as shown in FIG. 10*c*, to thereby fix the circuit member to the printed substrate. Thus, it will be noted that the circuit member can be as quite effectively and efficiently connected to a printed substrate as is possible in the previously described connection onto a socket. It is also noteworthy that in this instance the adapter 5 can be utilized as a spacer to be located between the body 1' of the circuit member and the printed substrate 4*a*. Such spacer is effective because it serves as the space or a heat sink for the protection of the body 1' of the circuit member from the effect of the heat which is produced in soldering the lead wires 2 onto the conductive layer 8*a* provided on the face of the printed substrate. The spacer can also be utilied as the mechanical holder for both the body 1' of the circuit member and the lead wires 2. The spacer is useful further in the provision of electrical insulation between the plurality of lead wires or between the lead wires and other circuit members or in the prevention of a short-circuit therebetween.

The present invention has been described in detail in connection with some of the embodiments. It should be understood, however, that the present invention is not restricted to these embodiments, and that various modifications can be made without departing from the spirit of the invention.

What is claimed is:

1. An electronic circuit device comprising:

a circuit member including a body of the circuit member and a plurality of flexible lead wires stemming from said body of the circuit member, the free end portions of said plurality of lead wires extending to substantially the same direction, at least one part of the circuit member being made of a magnetic substance; and a connecting adapter including a magnetic substance, said adapter being provided with first and second surfaces opposed to each other and a plurality of holes formed between said first and second surfaces and corresponding to said plurality of lead wires, the thickness of said adapter between said first and second surfaces being less than the length of said lead wires;

said plurality of lead wires being slidably inserted through said plurality of holes, respectively, the free end portion of said lead wires projecting from said holes of said adapter, the adapter being adhered to said circuit member by the magnetic force between said adapter and said circuit member.

2. An electronic circuit device according to claim 1, wherein said adapter consists substantially of a sintered magnetic oxide.

3. An electronic device according to claim 1, wherein said adapter consists substantially of rubber including a magnetic substance.

4. An electronic circuit device according to claim 1, wherein said adapter consists substantially of a magnet coated with an insulator.

5. An electronic circuit device comprising:

a circuit member including a body of the circuit member and a plurality of flexible lead wires stemming from said body of the circuit member, the free end portions of said plurality of lead wires extending to substantially the same direction; and a connecting adapter including a central portion and a peripheral portion surrounding and detachably connected to said central portion, said central portion and said peripheral portion having first and second surfaces opposed to each other, said adapter being provided with a plurality of holes extending between said first and second surfaces and formed in the intersection between said central and peripheral portions, the thickness of said adapter between said first and second surfaces being less than the length of said lead wires;

said plurality of lead wires being slidably inserted through said plurality of holes, respectively, and the free end portion of said lead wires projecting from said holes of said adapter.

6. A method for connecting a circuit member having a body and a plurality of lead wires stemming from said body to a female member having a plurality of lead-wire introducing portions in which said lead wires are to be inserted, comprising the steps of:

preparing a combination of said circuit member and an adapter having first and second surfaces opposed to each other and a plurality of holes formed between said first and second surfaces and corresponding to said plurality of lead wires, the thickness of said adapter between said first and second surfaces being less than the length of said lead wires, said plurality of lead wires being slidably inserted in said plurality of holes, respectively;

placing said combination of said adapter and said circuit member on said female member so that said holes of said adapter are in contact and in register with said lead-wire introducing portions formed in the female member, and so that the free end portions of said lead wires are located in said holes of said adapter; and causing the free end portions of the lead wires to move along said holes of said adapter into said lead-wire connecting portions of said female member.

7. A method according to claim 6, characterized in that the adapter is of a non-circular plane configuration and that said female member is provided with an uneven surface corresponding to said non-circular plane configuration of said adapter for defining the location and the direction of said adapter when mounted on said female member.

8. A method according to claim 6, wherein, in the step of preparing said combination of said circuit member and said adapter, said adapter is disposed near said body of the circuit member and the free end portions of said lead wires which are projected from said holes of said adapter are bent to such an extent that the relative sliding movement between said lead wires and the adapter is not hampered and to such an extent that the adapter will not casually become detached off the lead wires of said circuit member.

9. A method for successively connecting a circuit member having a body of said circuit member and a plurality of lead wires stemming from the body of the circuit member to a plurality of female members each of which has a plurality of lead-wire introducing portions in which said lead wires are to be inserted, comprising the steps of:

preparing a combination of said circuit member and an adapter having first and second surfaces opposed to each other and a plurality of holes formed between said first and second surfaces and corresponding to said plurality of lead wire, the thickness of said adapter between said first and second surface being less than the length of said lead wires, said plurality of lead wires being slidably inserted in said plurality of holes, respectively;

placing said combination of said adapter and said circuit member on a female member so that said holes of said adapter are in contact and in register with the lead-wire introducing portions of the female member, and so that the free end portions of said lead wires are located in said holes of said adapter;

causing the free end portions of said lead wires to move along said holes of said adapter into said lead-wire connecting portions of said female member;

subsequently inserting said lead wires of said circuit member into lead-wire introducing portions of another female member by the same procedure as said steps of placing and causing.

10. A method for connecting a circuit member having a body of said circuit member and a plurality of lead wires stemming from the body of the circuit member to a female member having a plurality of lead-wire introducing portions in which said lead wires are to be inserted, comprising the steps of:

preparing a combination of said circuit member and an adapter having first and second surfaces opposed to each other and a plurality of holes formed between said first and second surfaces and corresponding to said plurality of lead wires, the thickness of said adapter between said first and second surfaces being less than the length of said lead wires, said plurality of lead wires being slidably inserted in said plurality of holes, respectively, said circuit member and said adapter including a magnetic material thereby detachment of said adapter from said circuit member being prevented by a magnetic force therebetween;

placing said combination of said circuit member and said adapter on said female member so that said holes of said adapter are in contact and in register with said lead-wire introducing portions formed in the female member, and so that the free end portions of said lead wires are located in said holes of said adapter; and causing the free end portions of the lead wires to move along said holes of said adapter into corresponding lead-wire connecting portions of said female member.

11. A method for successively connecting a circuit member having a body of said circuit member and a plurality of lead wires stemming from the body of the circuit member to a plurality of female members each of which has a plurality of lead-wire introducing portions in which said lead wires are to be inserted, comprising the steps of:

preparing a combination of said circuit member and an adapter having first and second surfaces opposed to each other and a plurality of holes formed between said first and second surfaces and corresponding to said plurality of lead wires, the thickness of said adapter between said first and second surfaces being less than the length of said lead wires, said plurality of lead wires being slidably inserted in said plurality of holes, respectively, said circuit member and said adapter including a magnetic material thereby detachment of said adapter from said circuit member being prevented by a magnetic force therebetween;

placing said combination of said adapter and said circuit member on a female member so that said holes of said adapter are in contact and in register with the lead-wire introducing portions of the female member and so that the free end portions of said lead wires are located in said holes of said adapter;

causing the free end portions of said lead wires to move along said holes of said adapter into the corresponding lead-wire connecting portions of said female member;

detaching the combination of said circuit member and the adapter from said female member while the circuit member and the adapter are combined unitarily by a magnetic force therebetween; and subsequently inserting said lead wires of said circuit member into lead-wire introducing portions of another female member by the same procedure as said steps of placing and causing.

12. A method for connecting a circuit member having a body of said circuit member and a plurality of lead wires stemming from the body of the circuit member to a female member having a plurality of lead-wire introducing portions in which said lead wires are to be inserted, comprising the steps of:

preparing a combination of said circuit member and and adapter having a lug portion made of a soft and resilient material, said adapter being detachably attached to the body of said circuit member by means of said lug portion, said adapter being provided with first and second surfaces opposed to each other and a plurality of holes formed between said first and second surfaces and corresponding to said plurality of lead wires, the thickness of said adapter between said first and second surfaces being less than the length of said lead wires, said plurality of lead wires being slidably inserted in said plurality of holes, respectivey;

placing said combination of said circuit member and said adapter on said female member so that said holes of said adapter are in contact and in register with said lead-wire introducing portions formed in the female member, and so that the free end portions of said lead wires are located in said holes of said adapter, while the adapter is detached from said body of said circuit member;

causing the free end portions of the lead wires to move along said holes of said adapter into the corresponding lead-wire connecting portions of said female member.

13. A method for successively connecting a circuit member having a body of said circuit member and a plurality of lead wires stemming from the body of the circuit member to a plurality of female members each of which has a plurality of lead-wire introducing portions in which said lead wires are to be inserted, comprising the steps of:

preparing a combination of said circuit member and an adapter having a lug portion made of a soft and resilient material, said adapter being detachably attached to the body of said circuit member by means of said lug portion, said adapter being provided with first and second surfaces opposed to each other and a plurality of holes formed between said first and second surfaces and corresponding to said plurality of lead wires, the thickness of said adapter between said first and second surfaces being less than the length of said lead wires, said plurality of lead wires being slidably inserted in said plurality of holes, respectively;

placing said combination of said circuit member and said adapter on a female member so that said holes of said adapter are in contact and in register with the lead-wire introducing portions formed in the female member, and so that the free end portions of said lead wires are located in said holes of said adapter, while the adapter is detached from said body of said circuit member;

causing the free end portions of the lead wires to move along said adapter into the corresponding lead-wire connecting portions of said female member;

detaching the combination of said circuit member and the adapter from said female member while the adapter is attached to the body of said circuit member by means of said lug portion; and subsequently inserting said lead wires of said circuit member into lead-wire introducing portions of another female member by the same procedure as said steps of placing and causing.

References Cited

UNITED STATES PATENTS

| | | | |
|---|---|---|---|
| 2,099,405 | 11/1937 | Langdon | 339—59 |
| 2,764,747 | 9/1956 | Modrey | 339—12 |
| 2,966,618 | 12/1960 | Lehner | 317—101 |
| 3,122,679 | 2/1964 | Kislan et al. | 317—100 |
| 3,184,536 | 5/1965 | Vincent | 174—138 |
| 3,225,262 | 12/1965 | Meyers | 174—138 XR |
| 3,250,851 | 5/1966 | Boening | 174—138 |
| 3,263,200 | 7/1966 | Kocmich | 339—17 |
| 3,388,366 | 6/1968 | Mitchell | 339—17 |

FOREIGN PATENTS

| | | |
|---|---|---|
| 577,265 | 6/1959 | Canada. |
| 1,070,707 | 12/1959 | Germany. |

MARVIN A. CHAMPION, Primary Examiner

P. A. CLIFFORD, Assistant Examiner

U.S. Cl. X.R.

339—17; 174—138; 29—626